Oct. 7, 1952          R. WIKEN            2,612,764
                       COUPLING
Filed Dec. 20, 1946                    2 SHEETS—SHEET 1

INVENTOR
Ralph Wiken
BY
Ralph W Brown
ATTORNEY

Oct. 7, 1952  R. WIKEN  2,612,764
COUPLING
Filed Dec. 20, 1946  2 SHEETS—SHEET 2
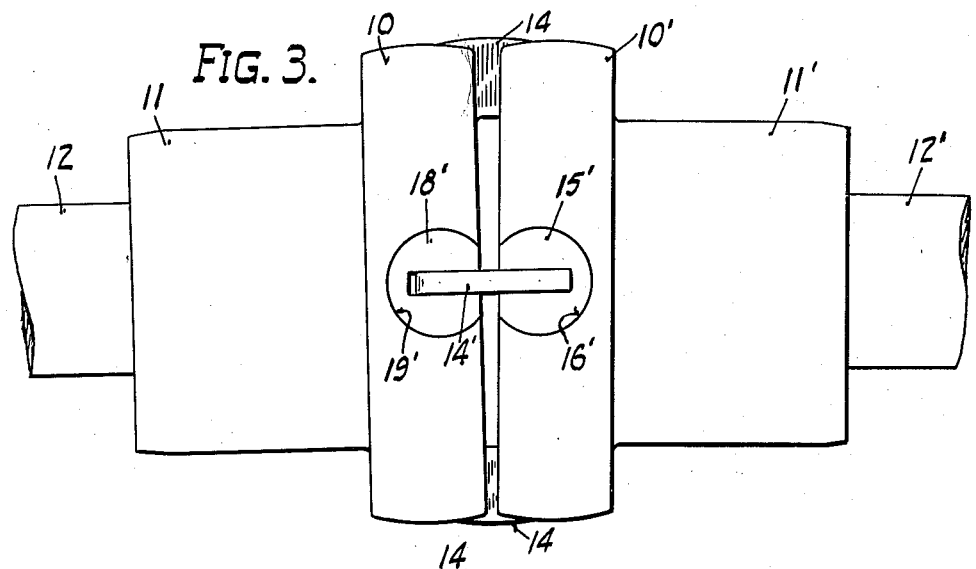
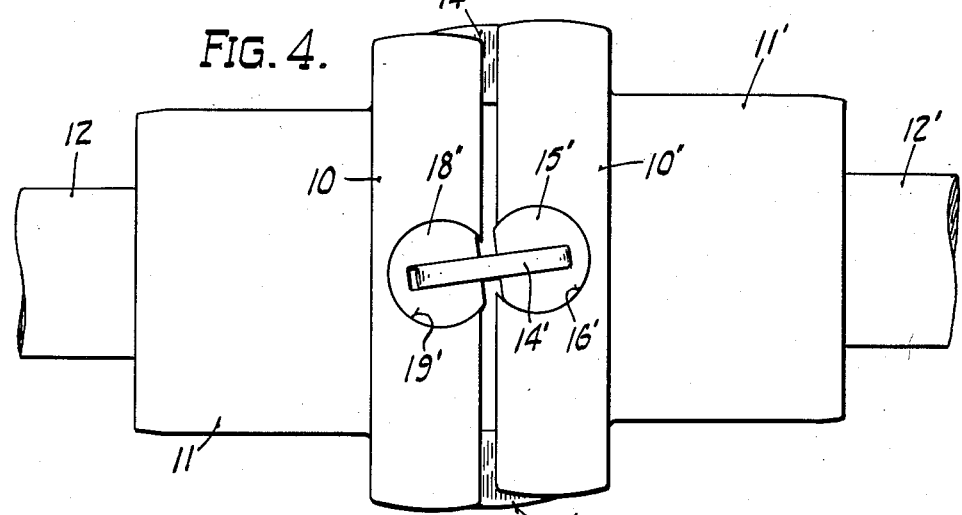
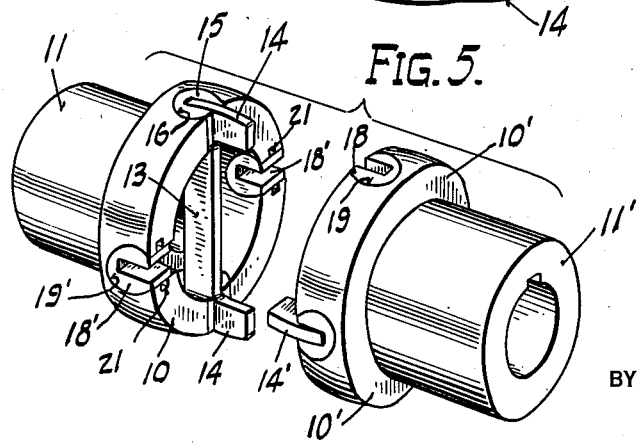
INVENTOR
Ralph Wiken
BY
Ralph Brown
ATTORNEY Patented Oct. 7, 1952

2,612,764

UNITED STATES PATENT OFFICE 2,612,764

COUPLING

Ralph Wiken, Milwaukee, Wis., assignor to The Falk Corporation, Milwaukee, Wis., a corporation of Wisconsin Application December 20, 1946, Serial No. 717,435

2 Claims. (Cl. 64—6)

This invention relates to power transmitting flexible couplings.

One object of the present invention is to provide an improved flexible coupling of simple inexpensive design capable of accommodating both angular and parallel misalignment.

Another object is to provide a torsionally elastic coupling of improved construction.

Other more specific objects and advantages will appear, expressed or implied, from the following description of a power coupling exemplifying the present invention.

In the accompanying drawings:

Figs. 3 and 4 are views in side elevation, with the lubricant retainer removed, respectively illustrating the relation of parts during conditions of angular and parallel misalignment.

Fig. 5 is a view in perspective with the coupling heads axially separated.

Figure 1:
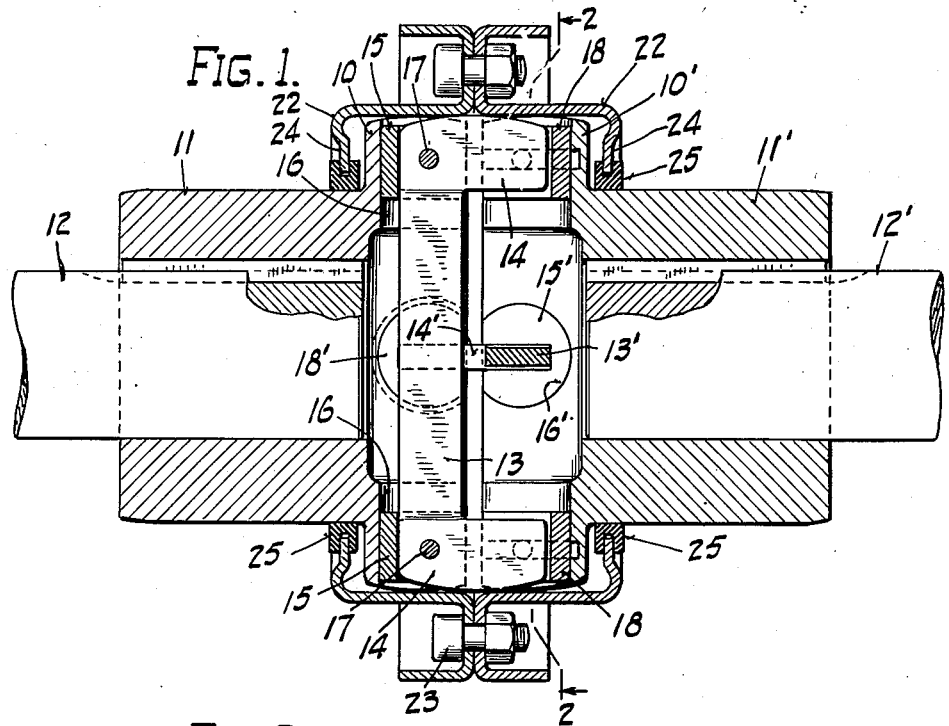
Figure 1 is an axial sectional view of a coupling constructed in accordance with the present invention.
Figure 2:
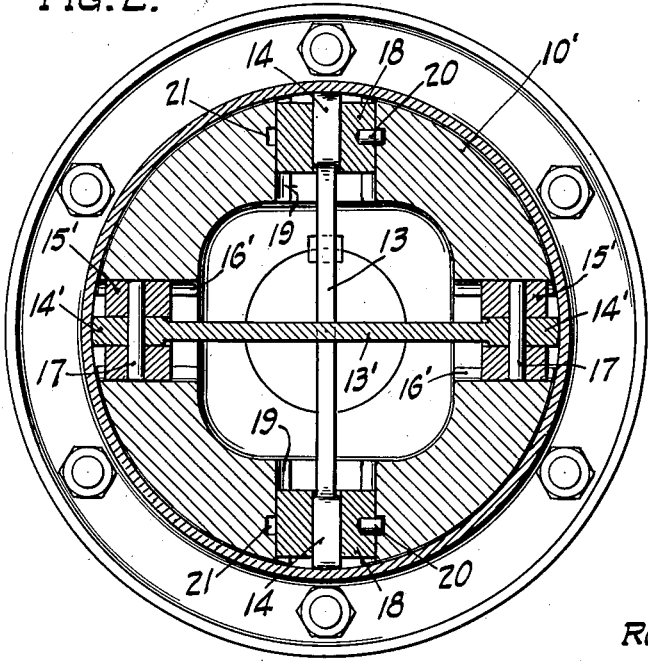
Fig. 2 is a transverse sectional view taken along the line 2—2 of Fig. 1.

The coupling selected for illustration comprises two hollow coupling heads 10 and 10' each having an integral hub 11 or 11' adapted to be keyed or otherwise fixed to conventional power transmitting shafts 12 and 12', respectively.

The coupling heads 10 and 10' are shown interconnected through a pair of bars 13 and 13', each being rockably mounted in and disposed diametrically of one of the heads, and each having a pair of arms 14 or 14' projecting laterally from the opposite ends thereof into driving relation with the other of said heads. The bars 13 and 13' are preferably disposed at right angles to each other.

In this instance each bar 13 or 13' is seated at opposite ends in cylindrical bushings 15 or 15' which are diametrically slotted to receive the bars. Each of the bushings 15 and 15' is closely fitted for free rotation and axial movement in cylindrical seats 16 and 16' formed in the peripheries of the coupling heads, each of the seats 16 and 16' being open at one side to permit the arms 14 and 14' to project therethrough and to rotate freely with the supporting bushings 15 and 15' without interfering with the seats. Each bar 13 and 13' is thus free to rotate with its supporting bushings 15 or 15' and to shift lengthwise therewith within and diametrically of the coupling head 10 or 10' in which it is mounted. Each bar 13 and 13' is preferably anchored to its supporting bushings by suitable means such as pins 17 extending therethrough.

The arms 14 or 14' of each bar 13 or 13' project into close sliding engagement within similarly slotted cylindrical bushings 18 or 18' rotatably mounted in cylindrical seats 19 and 19' similar to the seats 16 and 16', so that these arms are rockable and radially slidable with respect to both of the coupling heads 10 and 10'. Each of the bushings 18 and 18' are retained in their seats 19 and 19' by suitable means such as locking pin 20 carried thereby and loosely engaged in an internal channel 21 formed in the periphery of the seat.

In this instance the two coupling heads 10 and 10' are shown loosely encircled by an appropriate lubricant retainer housing. The housing shown comprises two axially separable rings 22 loosely supported on the heads and releasably joined by a series of bolts 23, each of the rings 22 having an inturned flange 24 which coacts with a sealing ring 25 to prevent escape of lubricant from the housing.

From the foregoing it will be noted that, since the two coupling heads 10 and 10' are interconnected solely through the two bars 13 and 13' and their arms 14 and 14', the bars being arranged at right angles to each other and each free to move lengthwise or diametrically of the heads as well as laterally toward and from one of the heads, and each also being free to rock about its longitudinal axis and with respect to both heads, both heads are thus freely adjustable relative to each other in such directions as to accommodate both angular and parallel misalignment of the shafts 12 and 12'.

In Fig. 3 for instance one arm 14 has somewhat retracted from the head 10' and the other arm 14 of the same bar has advanced somewhat into the head 10' to accommodate angular misalignment, the rotatable bushings 15' and 18' having permitted an angular displacement of both heads 10 and 10' with respect to the arms 14' of the other bar in this figure; and in Fig. 4 both arms 14 of one bar have shifted diametrically of both heads 10 and 10', while the arms 14' of the other bar have tilted with respect to both heads, to accommodate the parallel misalignment therein portrayed.

It will also be noted that although both bars 13 and 13' and their arms 14 and 14' are thus free to tilt in a manner to accommodate misalignment, yet both bars are effective to transmit a torque load from one coupling head 10 or 10' to the other, since neither is influenced to thus tilt by the torque load transmitted thereby. This should be clear from inspection of Fig. 5. If it be assumed for instance that the head 10 is the driver and the head 10' the driven head, it will be noted that the projecting ends of the arms 14 of the bar 13 would normally react at diametrically opposite points on the head 10', so that the resultant reaction forces on the projecting ends of these arms are equal and in opposite direction and thus balance each other. These equal and opposite reaction forces are sustained by the torsional resistance of the bar 13, without influencing the bar to tilt as a unit about its longitudinal axis.

Since, as above noted, the torque transmitted from one coupling head 10 or 10' to the other is sustained by the bars 13 and 13', and since the arms 14—14 or 14'—14' of each bar are seated in separate independently rockable bushings 18—18 or 18'—18', the arms of each bar are capable of deflecting relative to each other under the transmitted load in a manner to induce a torsional deflection in each bar, and because of this novel arrangement the coupling possesses an advantageous torsional elasticity to a degree dependent upon the combined torsional elasticity of the bars.

Various changes may be made in the embodiment of the invention hereinabove specifically described without departing from or sacrificing the advantages of the invention as defined in the appended claims.

I claim:

1. In a power coupling the combination of driving and driven coupling heads, a bar carried by each of heads and rockable about a longitudinal axis disposed substantially diametrically of said head, said bars being angularly disposed and rockable relative to each other, a pair of separate substantially aligned slotted bushings carried by each of said heads and independently rockable therein about an axis disposed substantially diametrically of said head, and a pair of arms extending from the opposite ends of each of said bars and projecting into the bushings of a pair.

2. In a power coupling the combination of driving and driven coupling heads, a transverse bar carried by each of said heads and rockable about an axis extending transversely of said head, a pair of separate aligned longitudinally slotted bushings carried by each of said heads and independently rockable therein about a transverse axis angularly disposed relative to said first named axis, and a pair of torque transmitting arms extending from the ends of each of said bars into the bushings of a pair, the arms of each pair being spaced from and rockable relative to the arms of the other pair.

RALPH WIKEN.

REFERENCES CITED

The following references are of record in the file of this patent:

UNITED STATES PATENTS

| Number | Name | Date |
|---|---|---|
| 1,625,511 | Ungerer | Apr. 19, 1927 |
| 1,659,693 | Kurtze | Feb. 21, 1928 |
| 2,148,975 | Agren | Feb. 28, 1939 |